INVENTORS
RALPH MILLINGTON
DAVID F. THOMPSON

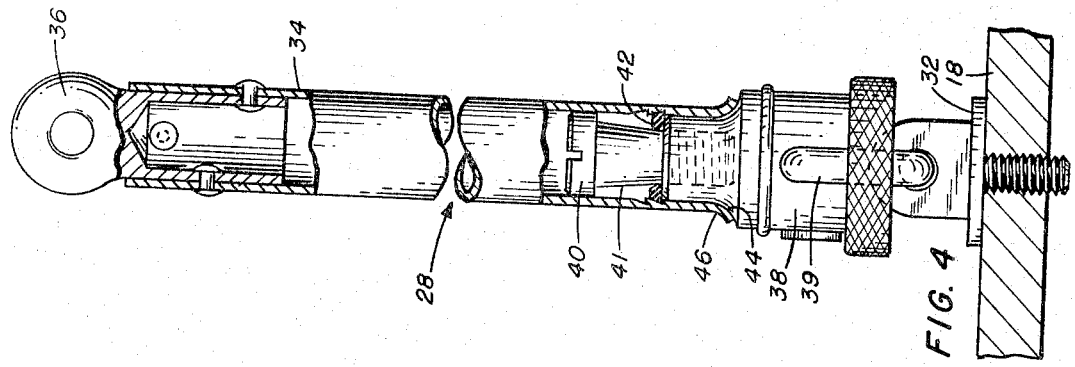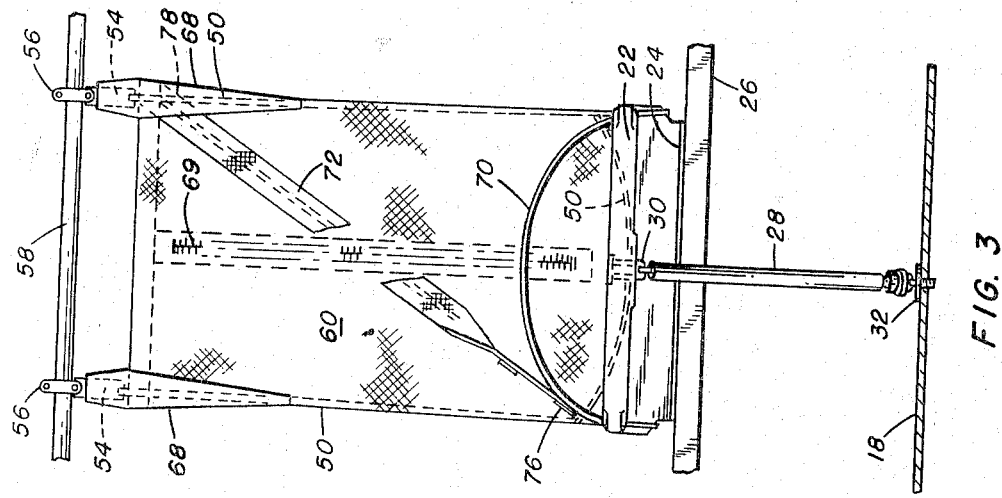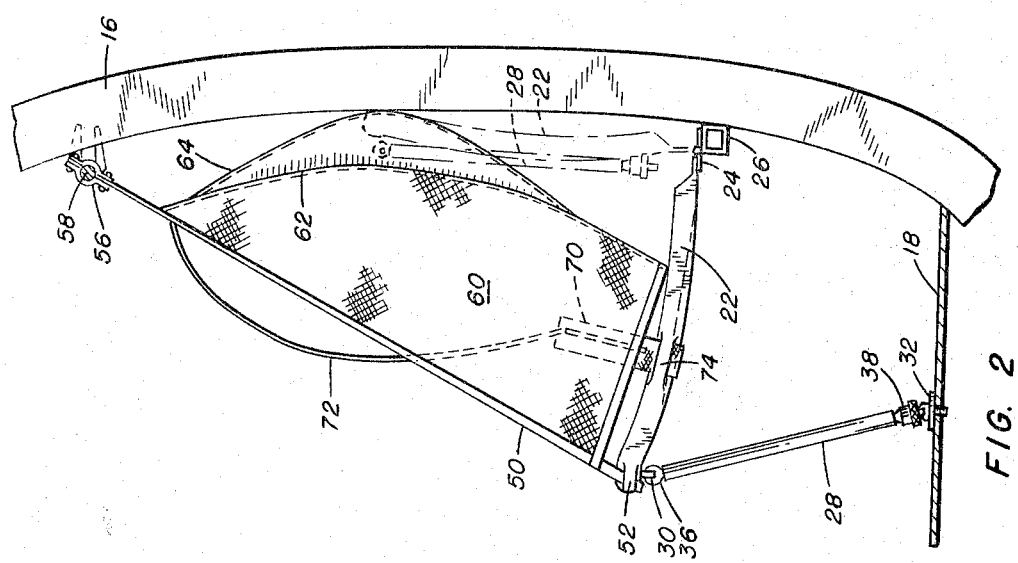

United States Patent Office 3,314,720
Patented Apr. 18, 1967

3,314,720
SAFETY TROOP SEAT
Ralph Millington, West Chester, and David F. Thompson, Media, Pa., assignors, by mesne assignments, to the United States of America as represented by the Secretary of the Navy
Filed Feb. 11, 1965, Ser. No. 432,031
5 Claims. (Cl. 297—389)

The invention described herein may be manufactured and used by or for the Government for governmental purposes without payment of any royalty thereon.

The present invention relates to aircraft troop seats and more particularly to troop seats designed for airplane or helicopter use wherein there is provided occupant safety under crash or hard landing conditions.

The present invention is especially adapted for use in modern transport helicopters to provide adequate protection to personnel, other than the pilot thereof, during crash or hard landing conditions. As is well known, the mortality and serious injury rate among passengers in aircraft crashes is extremely high due, in large part, to the extremely high forces encountered and the lack of adequate physical protection.

Various methods and devices have previously been employed for minimizing these injuries such as conventional seat belts and resilient net sling seats. Although such devices have served the purpose, they have not proven entirely satisfactory under all conditions of service. The use of seat belts has proven the most popular and simplest safety precaution due to their low cost and ease of use. They have not, however, materially reduced aircraft injuries since, if not used in combination with energy absorbing devices and upper torso restraint mechanisms, they often break or produce internal injuries due to the high forces encountered in crash landings and the small contact area between the seat belts and the passenger's body. The use of resilient fabric sling seats, although of possible benefit in a rough or hard landing, do not provide adequate protection during severe crash landings since, being resilient, they first stretch in one direction to absorb the energy of impact but then rebound thereby jerking the occupant in a violent back and forth manner. Furthermore, these seats do not provide a constant rate of energy absorption over the entire shock absorbing stroke, nor do they provide passenger comfort since, being resiliently suspended, they continually oscillate back and forth thereby causing possible motion sickness and passenger discomfort.

Accordingly, the general purpose of this invention is to provide a safety troop seat which embraces all the advantages of similarly employed safety seats but which possesses none of the afore-described disadvantages. To attain this, the present invention utilizes a unique combination of non-resilient shock absorbing and restraining devices which provide complete shock absorption and restraint in all directions. This is accomplished by utilizing a honeycomb core seat pan which is supported from the aircraft floor by a shock absorbing strut and also supported from the aircraft side walls by a continuous hinge and a pair of shock absorbing straps. In addition, a fabric back and side support is suspended between said straps in a generally U-shaped configuration to provide occupant restraint while a lap and shoulder safety belt is provided for preventing the occupant from being thrown out of the seat. By this arrangement a passenger is protected by one or more of the afore-described shock absorber and restraint devices in whatever position the plane or helicopter lands.

Therefore, an object of the present invention is the provision of a new and novel safety troop seat which provides superior protection to the occupant thereof.

Another object is to provide a safety troop seat which provides occupant retention and restraint in all directions thereby avoiding violent body motions and impact thereof against the aircraft structure.

A further object of the invention is the provision of a safety troop seat which provides unusually long energy absorbing strokes both in a vertically downward and a horizontal plane.

Still another object is to provide a thin-walled honeycomb core seat pan which prevents formation of lethal edges and points as often occurs in failures of conventional seats upon impact.

Yet another object of the present invention is the provision of a high strength safety troop seat which, though giving maximum protection to the occupant thereof, is extremely flexible and may be folded easily and stowed in a small space.

A still further object of the present invention is the provision of a safety troop seat which utilizes shock absorbers that non-resiliently absorb the energy of a hard or crash landing at a constant rate.

Still another object is to provide a safety troop seat which is characterized by simplicity of construction, ease of maintenance and use and low cost.

Other objects and many of the attendant advantages of this invention will be readily appreciated as the same becomes better understood by reference to the following detailed description when considered in connection with the accompanying drawings in which:

FIG. 2 is a side elevation, partly in section, of the seat shown in FIG. 1 with the seat pan and the support strut shown in phantom in the folded and stowed position;

FIG. 3 is a front elevation view, partly in section, of the seat shown in FIG. 1;

FIG. 4 is a side view, partly in section, of the support strut; and

Figures 1, 5:
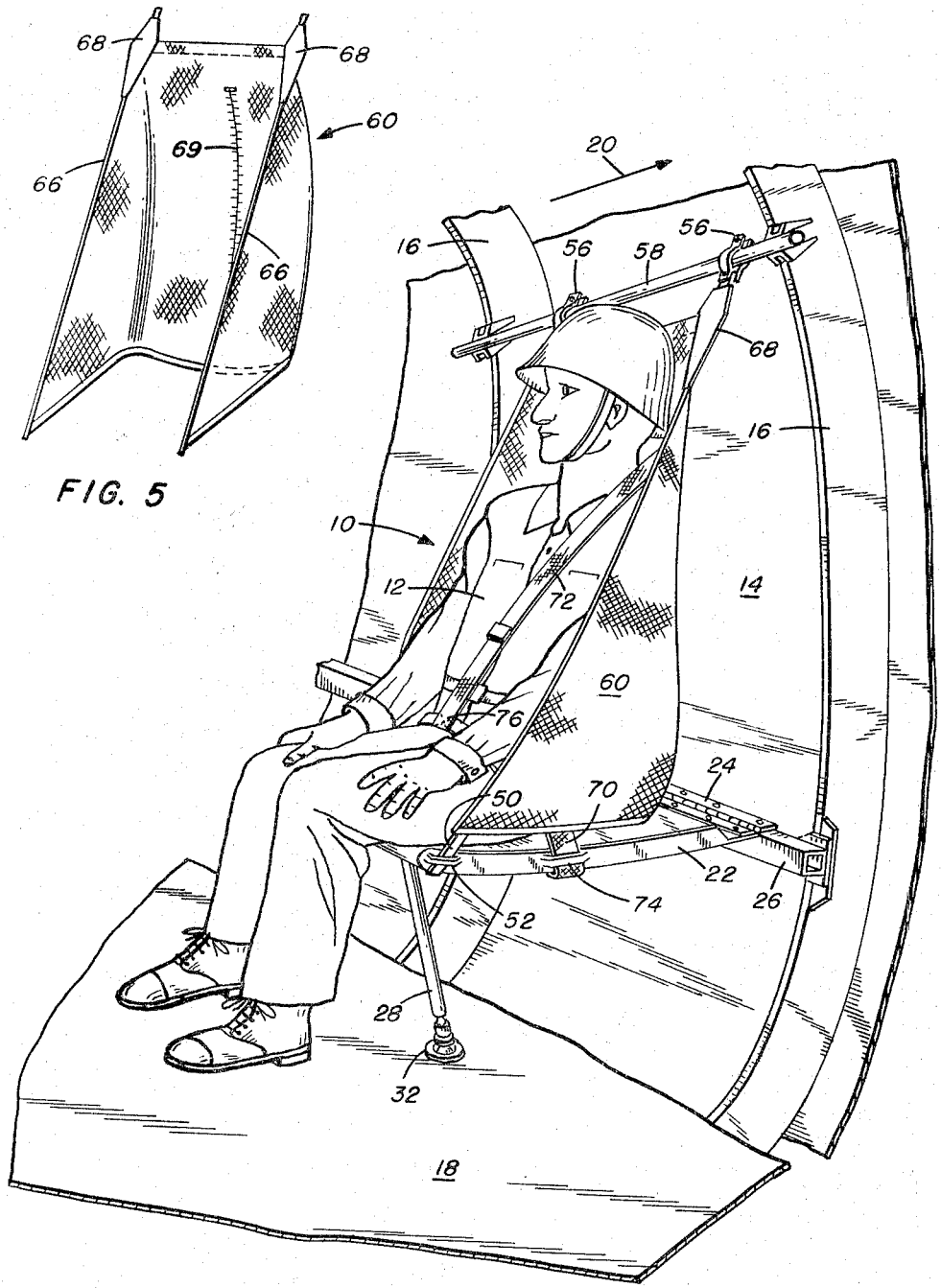
FIG. 1 is a perspective view showing an occupant seated in the safety troop seat of the present invention.
FIG. 5 is a perspective view of the fabric back and side support.

Referring now to the drawings wherein like reference characters designate like or corresponding parts throughout the several views, there is shown in FIG. 1, which illustrates a preferred embodiment of the invention, a safety troop seat, generally indicated by reference character 10, having an occupant 12 seated therein. The seat 10 is shown within the fuselage of a transport aircraft having a side wall 14, a plurality of vertically disposed braces 16, and a floor 18, with the direction of motion of the aircraft being indicated by arrow 20. Though only one seat is shown in the drawing, it should be realized, of course, that a plurality of such seats could be positioned against both side walls of the aircraft to accommodate a large number of passengers. The seat 10 is comprised of a seat pan 22 having a thin-walled honeycomb core construction of aluminum, or the like, and reinforced at strategic points with fiberglass. This construction prevents the formation of lethal edges and points as often occurs on conventional seats when subjected to the impact of a hard or crash landing. One side of a continuous hinge 24 is secured, as by riveting, along the entire length of the rear edge of the seat pan 22 and the other side is secured to the transverse brace 26 which forms a part of the aircraft structure. The use of a continuous hinge avoids highly stressed single attachments and provides the necessary strength and directional stability required of a safety seat. The seat pan 22 is further supported at its front edge by a shock absorbing strut 28 which, as illustrated in FIGS. 2 and 3, is secured to the underside of the seat pan 22 by a fitting 30. The lower end of the shock absorbing strut 28 is secured to the floor by a self-aligning fitting 32 which is also provided with a quick disconnect mechanism so that the seat pan 22 and strut 28 can be quickly folded upwardly against the side wall 14 of the aircraft for stowage, as illustrated in phantom in FIG. 2.

The shock absorbing strut 28, as best illustrated in FIG. 4, is of the metal yielding type which provides constant energy absorption in compression and positive locking in tension at any position throughout the stroke. Therefore, the strut 28 will absorb the energy of a crash or hard landing at a constant rate throughout the entire shock absorbing stroke and yet will not rebound or oscillate as is common in conventional resilient shock absorbers. The shock absorbing strut 28 consists of a metal cylindrical tube 34 having an end fitting 36 secured thereto for engagement with the seat pan fitting 30 and a base 38 having a fitting 39 for engagement with the floor fitting 32. An upwardly projecting stationary piston 40 is secured to the base 38 by a tapered piston rod 41 having a split spring washer 42 therearound. The base 38 is further provided with an annular outer surface 44 flared outwardly at its lower end so that the tube 34, when assembled over the piston 40, the spring washer 42 and the outer flared surface 44 is caused to flare outwardly as at 46. The split spring washer 42 is sized to provide an interference fit with the tube 34 and this fit plus the flared end 46 of the tube 34 bearing against the flared surface 44 maintains the seat pan 22 rigidly in place under normal occupant use and flight conditions. However, should a hard or crash landing occur, the seat pan 22 and the occupant 12 would exert a compressive load on the shock absorbing strut 28 in excess of a predetermined amount thereby forcing the tube 34 downwardly over the flared portion 44 of the base 38 causing the tube 34 to yield and disintegrate thereby absorbing energy. If the shock absorbing strut 28 is placed in tension, at any time, the spring washer 42 is forced up the tapered piston rod 41 thereby expanding into the tube 34 and creating a positive lock. An alternative arrangement would be to utilize a Belleville washer in place of the spring washer whereupon the tapered slide would not be required. This positive locking mechanism prevents the shock absorbing strut 28 from recoiling and causing possible occupant injury after the initial crash impact.

The seat pan 22 is further supported by a pair of straps 50, the lower ends of which pass through slots 52 in the seat pan 22 and are secured together on the underside of the seat pan 22 by an adjustable fastener (not shown). As best illustrated in FIG. 3, the upper extremities of the straps 50 are secured to a pair of shock absorbing devices 54 which in turn are secured to a pair of brackets 56 pivotally clamped around brace 58 forming a part of the aircraft structure. Though the details of the shock absorbers 54 are not shown, the shock absorbers are of the metal bending type and preferably take the particular form described and claimed in the copending application, Ser. No. 427,994, filed Jan. 25, 1965, now Patent No. 3,280,942, by Ralph Millington. As is therefore apparent from the foregoing description, the straps 50 support the seat pan 22 forming an oblique angle therewith and are secured at their upper extremities to the shock absorbing means.

A fabric support 60 of nylon, or the like, partially envelops the seat occupant 12 thereby providing back and side support and restraint therefor. The fabric 60 is constructed of two plys of material 62, 64 (FIG. 2) secured around and suspended from the straps 50 at the edges 66 thereof so as to provide an upright generally U-shaped fabric configuration with the depth thereof decreasing upwardly from a maximum at the seat pan 22. The fabric 60 is further suitably reinforced at highly stressed points as, for example, at 68 so as to prevent failure thereof under impact conditions. In addition, a zipper 69 is further provided to allow the seat occupant to wear a combat pack when required. The overall configuration of the fabric support 60 is clearly shown in FIG. 5.

The seat occupant 12 is restrained from forward movement by a lap strap 70 and a shoulder strap 72, the former passing through slots 74 in the edges of seat pan 22 and being secured together on the underside of the seat pan 22 by a suitable fastener while the latter is attached at one end 76 to the lap strap 70 and at the other end 78 to the upper extremities of the straps 50 and the fabric 60. Suitable adjustable fasteners are provided for both the lap strap 70 and the shoulder strap 72 so that the seat occupant 12 can get into and out of the seat 10 with ease.

A safety troop seat has therefore been described which limits the deceleration loads experienced by an occupant thereof in the vertical down, longitudinal fore and aft, and lateral left and right directions while providing occupant retention and restraint in all directions. Accordingly, if the deceleration load caused by impact is in a vertical downward direction, as it would be in the usual crash or hard landing situation, particularly with a helicopter, the load is absorbed by the two overhead shock absorbers 54, the shock absorbing strut 28 and the continuous hinge 24 holding the seat to the aircraft structure. If the deceleration load experienced is in a horizontal plane, that is in either a longitudinal fore or aft or a lateral left or right direction, the load is absorbed by the two overhead shock absorbers 54, the fabric support 60 and the lap and shoulder safety belts 70 and 72, respectively.

It should be understood, of course, that the foregoing disclosure relates to only a preferred embodiment of the invention and that many modifications or alterations may be made therein without departing from the spirit and scope of the invention as set forth in the appended claims.

What is claimed is:

1. In combination with an aircraft, a shock absorbing safety troop seat comprising:
   a seat pan pivotally secured to the side wall of the aircraft by a continuous hinge extending the entire length of the rearward edge of said seat pan;
   a non-resilient shock absorbing strut, one end of which is pivotally secured to the underside forward edge of said seat pan and the other end of which is pivotally and detachably secured to the aircraft floor, said strut being of the metal yielding type thereby rigidly securing said seat pan under normal loads but yielding when the load exceeds a predetermined amount;
   a pair of supporting straps secured at their respective upper ends to a pair of non-resilient shock absorbers, said shock absorbers being secured to the side wall of the aircraft at a point above said seat pan hinge, the opposite ends of said straps passing through slots near the forward edge of said seat pan so as to form an oblique angle therewith and being adjustably secured together at the underside thereof;
   fabric restraining means suspended between said support straps in an upright generally U-shaped configuration, the depth of said fabric decreasing from the lower end adjacent the seat pan to the upper end thereof; and
   a lap and shoulder strap, said lap strap being secured around the underside of said seat pan and said shoulder strap being secured at one end to said lap strap and at the other end to said upper end of one of said support straps;
   whereby an occupant seated in said safety troop seat is protected from vertical downward deceleration loads by said shock absorbers, said shock absorbing strut and said hinged seat pan and from longitudinal fore and aft and lateral left and right deceleration loads by said shock absorbers, said fabric and said lap and shoulder belts.

2. A shock absorbing safety troop seat, as set forth in claim 1, wherein said non-resilient shock absorbing strut comprises:

a base member having an annular outer surface flared at its lower end;

a cylindrical tube, one end of which is disposed over and is in contacting relationship with the annular outer and flared surfaces of said base member; and means locking said tube to said base member when said tube is placed in tension;

whereby, when a compressive force in excess of a predetermined amount is applied to said tube, said tube is caused to be forced over the flared end of said base thereby yielding and absorbing energy.

3. An aircraft safety seat comprising:

a seat pan having hinge means along its rearward edge attachable to the side wall of an aircraft;

a shock absorbing strut normally supporting said pan at the underside forward edge thereof;

a plurality of support straps secured to said pan at their lower ends;

a plurality of shock absorbing means secured to said support straps at the upper ends thereof;

fabric restraining and back supporting means suspended from said support straps;

a lap and shoulder strap secured to said pan and to one of said support straps;

whereby an occupant of said seat is restrained from movement in all directions and protected from the adverse effects of high deceleration loads.

4. A shock absorbing safety seat, as set forth in claim 3, wherein:

said shock absorbing strut and said shock absorbing means comprises non-resilient metal deforming shock absorbers.

5. A shock absorbing safety seat, as set forth in claim 4, wherein:

said fabric support and restraint means is suspended from said support strap means in an upright generally U-shaped configuration;

whereby a seat occupant is partially enveloped and thereby restrained from movement by said fabric.

References Cited by the Examiner
UNITED STATES PATENTS

| | | | |
|---|---|---|---|
| 1,355,005 | 10/1920 | Schechter | 297—14 X |
| 2,475,588 | 7/1949 | Bierman | 297—385 X |
| 2,637,368 | 5/1953 | Cotton | 297—216 |
| 2,639,913 | 5/1953 | Reynolds | 297—216 X |
| 2,682,931 | 7/1954 | Young | 297—216 X |
| 2,700,412 | 1/1955 | Evans et al. | 297—385 X |
| 2,829,702 | 4/1958 | Keating | 297—385 X |
| 2,971,566 | 2/1961 | Negroni | 297—216 |
| 3,059,966 | 10/1962 | Spielman | 297—216 |
| 3,132,721 | 5/1964 | Jackson | 188—1 |
| 3,143,321 | 8/1964 | McGehel et al. | 188—1 X |
| 3,236,333 | 2/1966 | Mitchell | 188—1 |

CASMIR A. NUNBERG, *Acting Primary Examiner.*

JAMES T. McCALL, *Examiner.*